(12) United States Patent
Thatcher

(10) Patent No.: US 8,136,693 B2
(45) Date of Patent: Mar. 20, 2012

(54) ATTACHABLE CONTAINER HAVING OPENABLE SNAP RING

(75) Inventor: Bryce Thatcher, Sugar City, ID (US)

(73) Assignee: Penguin Brands, Inc., Sharon Hill, PA (US)

( * ) Notice: Subject to any disclaimer, the term of this patent is extended or adjusted under 35 U.S.C. 154(b) by 729 days.

(21) Appl. No.: 11/544,298

(22) Filed: Oct. 7, 2006

(65) Prior Publication Data

US 2007/0095831 A1 May 3, 2007

Related U.S. Application Data

(60) Provisional application No. 60/724,695, filed on Oct. 7, 2005.

(51) Int. Cl.
*B65D 25/28* (2006.01)

(52) U.S. Cl. .............. 220/708; 220/212.5; 220/714; 220/717; 215/399; 224/148.6; 224/251; 224/269; 24/3.1; 24/3.11; 24/3.12; 24/599.4; 24/599.6; 24/600.9; 24/601.2

(58) Field of Classification Search .............. 220/212.5, 220/708, 714, 717, 751, 756; 215/399; 222/525; 224/148.6, 251, 269; 24/3.1, 3.11, 3.12, 24/599.4, 599.6, 599.7, 600.9, 601.2
See application file for complete search history.

(56) References Cited

U.S. PATENT DOCUMENTS

| 437,380 | A | | 9/1890 | Lundborg |
| 5,244,114 | A | | 9/1993 | Traegde |
| 5,270,909 | A | | 12/1993 | Weiss et al. |
| 5,433,339 | A | | 7/1995 | Sarver |
| D364,552 | S | | 11/1995 | Mathiassen |
| 5,573,152 | A | | 11/1996 | Arnold |
| 5,749,497 | A | | 5/1998 | Davis |
| 5,937,490 | A | * | 8/1999 | Mihailovic ............... 24/600.1 |
| 6,131,779 | A | | 10/2000 | Gendala |
| 6,772,488 | B1 | * | 8/2004 | Jensen et al. ............ 24/599.6 |
| 6,837,472 | B1 | * | 1/2005 | Beutz ........................ 248/312 |
| 6,880,714 | B2 | | 4/2005 | Blanchester |
| 7,040,509 | B2 | | 5/2006 | McLelland et al. |
| D525,780 | S | * | 8/2006 | Kelleghan .................. D3/215 |
| 7,137,607 | B2 | | 11/2006 | Hibbs et al. |
| 2003/0111496 | A1 | * | 6/2003 | Abbott ..................... 224/148.6 |
| 2004/0250386 | A1 | | 12/2004 | Goldberg |
| 2005/0173477 | A1 | * | 8/2005 | Scott ....................... 224/148.6 |

* cited by examiner

*Primary Examiner* — Anthony Stashick
*Assistant Examiner* — Madison L Wright
(74) *Attorney, Agent, or Firm* — John J. Skinner, Jr.; Michelman & Robinson, LLP; Charles N. Quinn

(57) ABSTRACT

A closure for a beverage container that has a cap for overlapping a mouth of the beverage container. An arcuate member attached to the cap having a pair of extremity portions separated from one another and a springing member is connected to the arcuate member proximate to one of the extremity portions that is angularly pivotally moveable in response to a manually applied force, between a first position at which the springing member closes and completes a continuous periphery of the arcuate member and a second position at which the arcuate member periphery is open.

17 Claims, 7 Drawing Sheets

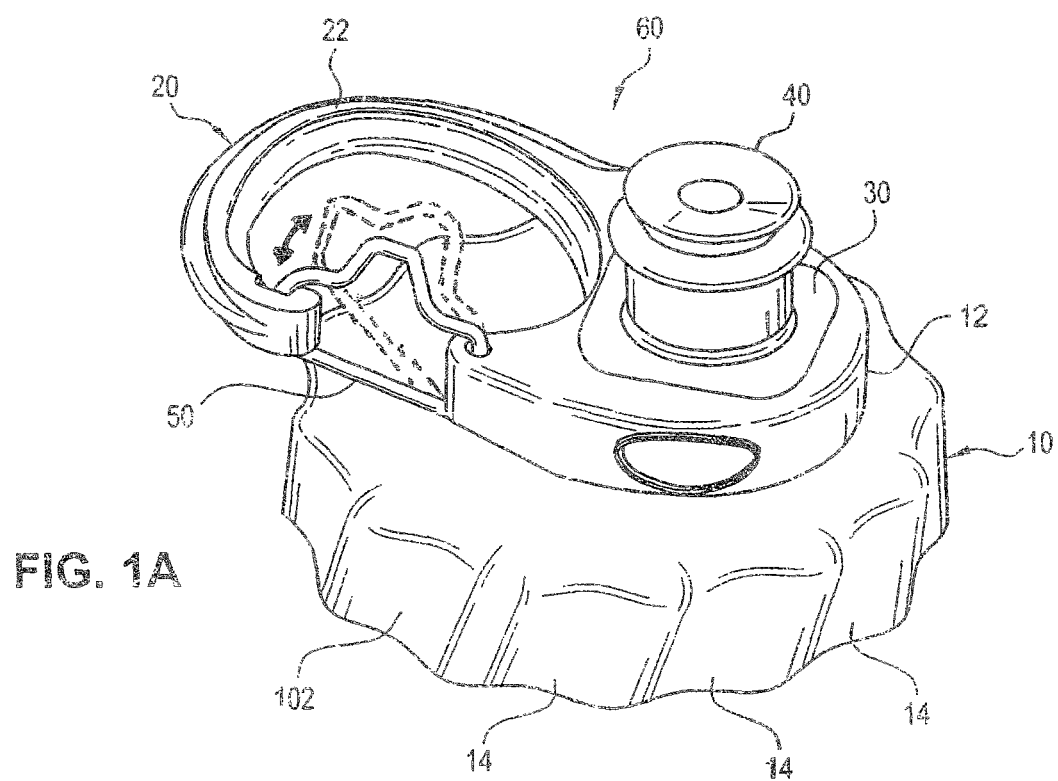
FIG. 1A
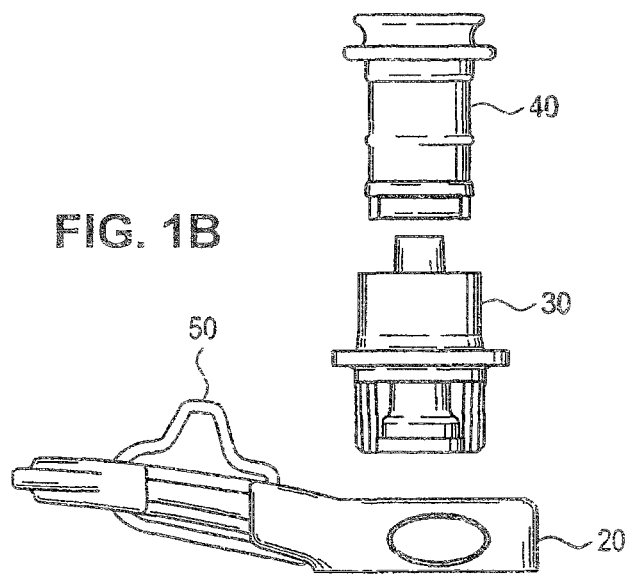
FIG. 1B
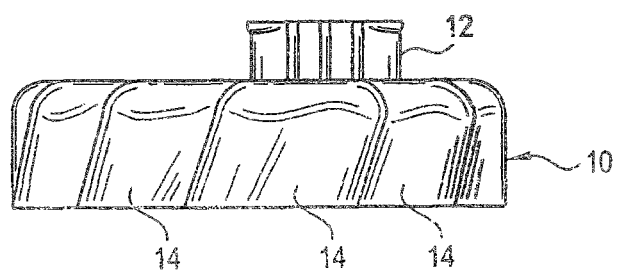

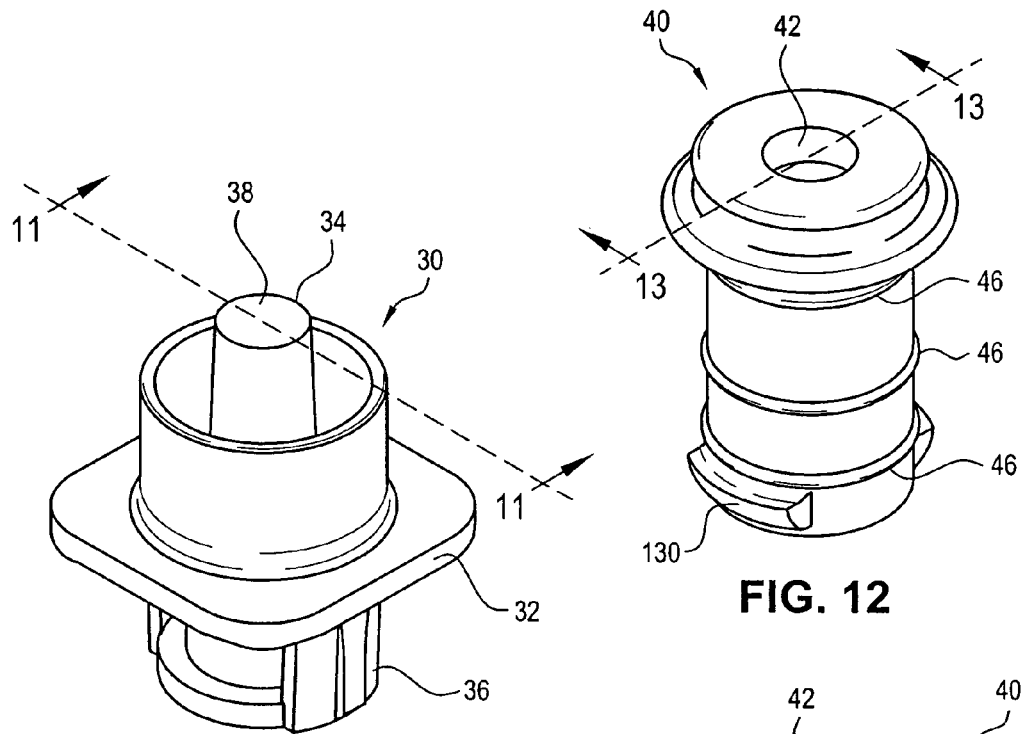
FIG. 10
FIG. 12
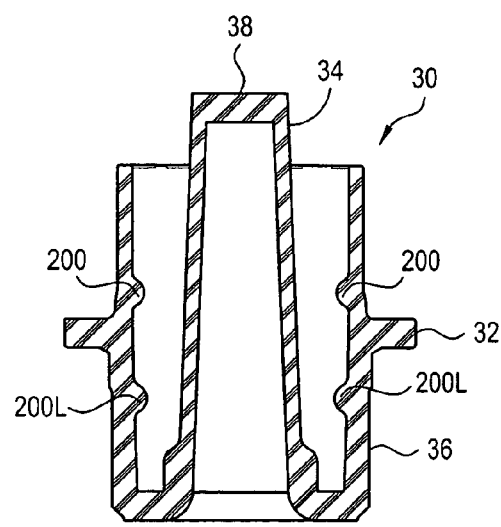
FIG. 11
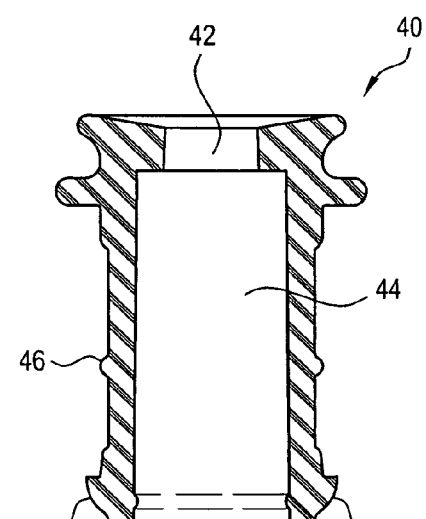
FIG. 13

ATTACHABLE CONTAINER HAVING OPENABLE SNAP RING

CROSS REFERENCE TO RELATED PATENT APPLICATION

This patent application claims the benefit, under 35 U.S.C. 119, of the filing date of U.S. provisional patent application Ser. No. 60/724,695, filed Oct. 7, 2005, in the name of Bryce Thatcher. The disclosure of that application, entitled "Container With Openable Snap Ring for Attachment", is hereby incorporated by reference in its entirety.

BACKGROUND OF THE INVENTION

1. Field of the Invention

This invention relates to beverage containers and the like and facilitates attachment of the container to clothing or other equipment of a person desiring to have the container close by at all times. The invention further relates to openable snap rings that may be used for attachment of objects, having structure around which the snap ring may be secured.

2. Description of the Prior Art

Different types of beverage containers are used during various activities. Beverage containers that are easily attachable to and detachable from garments, backpacks or other various materials or equipment are desirable. People participating in outdoor athletic activities, such as mountain climbing, hiking or camping, for example, need a beverage container that is easily attachable and detachable to and from the person's clothing or equipment, so both hands can be free during the activity. Such a beverage container is also desirable for non-athletic activities. For example, parents need a beverage container that is easily attachable to and detachable from one's clothing if neither the parents nor the child want to carry the beverage container.

Several approaches have been used in seeking an easily attachable and detachable beverage container. For example, U.S. Pat. No. 5,433,339 discloses apparatus that connects to a beverage container, namely adjustable apparatus with a carabiner that turns an ordinary beverage container into one that is easily attachable and detachable.

Other approaches attempt to utilize a carabiner by integrating the carabiner into the beverage container, such as by molding a part of the beverage container into the shape of a carabiner. For example, U.S. Pat. No. 5,270,909 discloses an ordinary mug with a carabiner as an integral part of the mug. A similar design is disclosed in United States patent publication US2004/0250386, where a carabiner is integrated into the lid of a beverage container.

Some designs incorporate an adjustable sleeve with a connector into which a beverage container may slide; U.S. Pat. No. 5,244,114 discloses using such a sleeve to attach beverage containers to a golf cart.

These known designs have shortcomings. For example, apparatus that attaches to, or holds, a given beverage container may not fit all beverage containers. Apparatus that is separate or separable from the beverage container may be easily lost or misplaced. Integrating a carabiner into the beverage container is difficult, with any resulting product being expensive to manufacture.

SUMMARY OF THE INVENTION

In one of its aspects this invention provides a container having a cap for covering a mouth of the container, an arcuate member connected to the cap with the arcuate member having a pair of extremity portions separated one from another, connection of which would close the periphery of the arcuate member, and a springing member connected to the arcuate member proximate one of the extremity portions of the arcuate member, with the springing member being angularly pivotally movable, responsively to applied force, between a first position at which the springing member closes and completes the continuous periphery of the arcuate member and a second position at which the arcuate member periphery is open.

Desirably, the springing member includes two legs, with each leg being connected to the same extremity portion of the arcuate member and offset one from another, with the two legs further being connected to each other at respective leg extremities which are remote from the positions of connection to the arcuate member. Most desirably the two legs are of unequal length and are a single piece of wire, preferably nylon or polycarbonate. Desirably, the wire is continuous.

In a preferred manifestation, the springing member connects to the arcuate member proximate one of the extremity portions of the arcuate member and is angularly pivotally movable in a first direction towards a position to close the arcuate member periphery in the course of relieving stress within the springing member, with the springing member being angularly pivotally movable towards a second position at which the arcuate member periphery is open, with such movement towards the second position being responsive to manually applied force.

In another of its aspects the invention provides a manually openable and closeable loop for retaining together, in predetermined minimal proximity one to another, at least two structures to be positioned within the loop, where the loop includes an arcuate member having a pair of extremity portions separated one from another, connection of which would close the periphery of the arcuate member, and a springing member connected to the arcuate member proximate one of the arcuate member extremity portions, with the springing member being angularly pivotally movable, responsively to applied force, between a first position at which the springing member closes and completes a continuous periphery of the arcuate member, and a second position at which the arcuate member periphery is open. In this aspect, the springing member desirably includes two legs with each leg being connected to the same extremity portion of the arcuate member, with the two legs further being connected to each other at respective leg extremities that are remote from positions of connection to the arcuate member. Most desirably, the two legs are of unequal length and are made of wire, which is preferably a single piece of wire fabricated from nylon or polycarbonate and is continuous.

In yet another aspect the invention provides a container including a body having a cavity for retaining a desired substance therein, an arcuate member connected to the body having a pair of extremity portions separated one from another, connection of which would close the periphery of the arcuate member, and a springing member connected to the arcuate member proximate one of the extremity portions and being angularly pivotally movable in a first direction towards a position to close the arcuate member periphery in the course of relieving stress, and being moveable in a second direction, towards a second position at which the arcuate member periphery is open, responsively to manually applied force.

BRIEF DESCRIPTION OF THE DRAWINGS

FIG. 1A is an isometric view of a cap according to the invention.

FIG. 1B is an exploded side elevation of the cap shown in FIG. 1A.

FIG. 10 is an isometric view of a valve portion of the cap illustrated in FIGS. 1A through 1D.

FIG. 11 is a vertical section of the valve taken at line 11 defining the transverse midpoint of the valve in FIG. 10.

FIG. 12 is an isometric view of a nozzle portion of the cap illustrated in FIGS. 1A through 1D.

FIG. 13 is a vertical section of the nozzle taken at line 13 defining the transverse midpoint of the nozzle in FIG. 12.

Figure 1C:
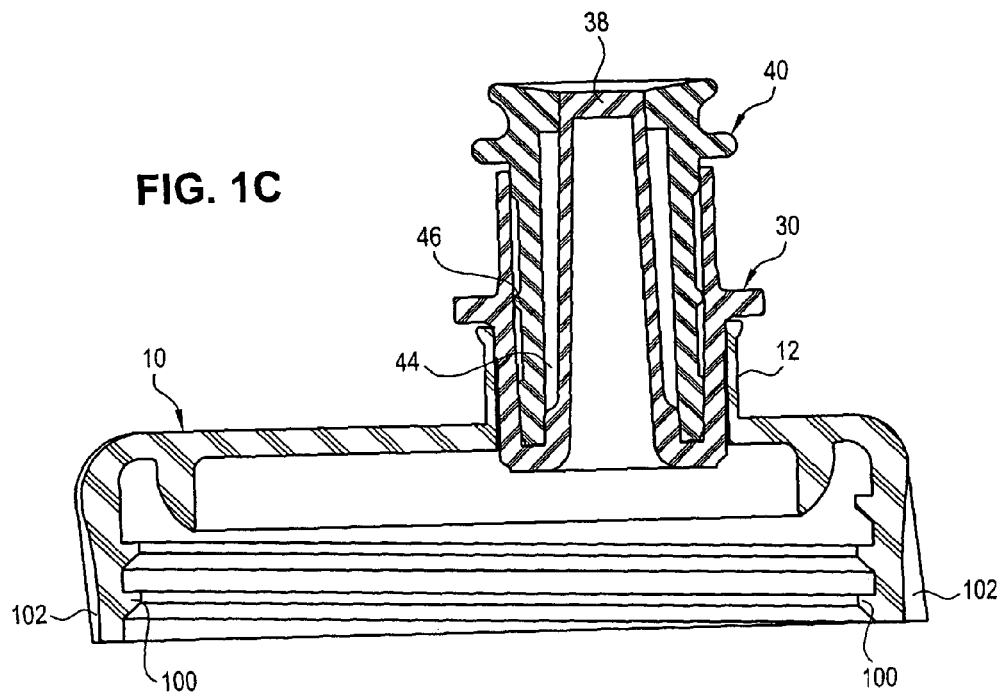
FIG. 1C is a vertical section of the cap shown in FIGS. 1A and 1B, looking in the same direction as in FIG. 1B, with a nozzle portion of the cap in a closed position.

DESCRIPTION OF THE PREFERRED EMBODIMENTS AND BEST MODES KNOWN FOR PRACTICE OF THE INVENTION

Referring to the drawings, FIG. 1A illustrates a cap designated generally 60, having an openable snap ring that may be used for attachment of the cap to a person's clothing, backpack, belt loop or other equipment, with cap 60 being used to overlap and thereby close the mouth of a beverage container or other receptacle.

Figure 2:
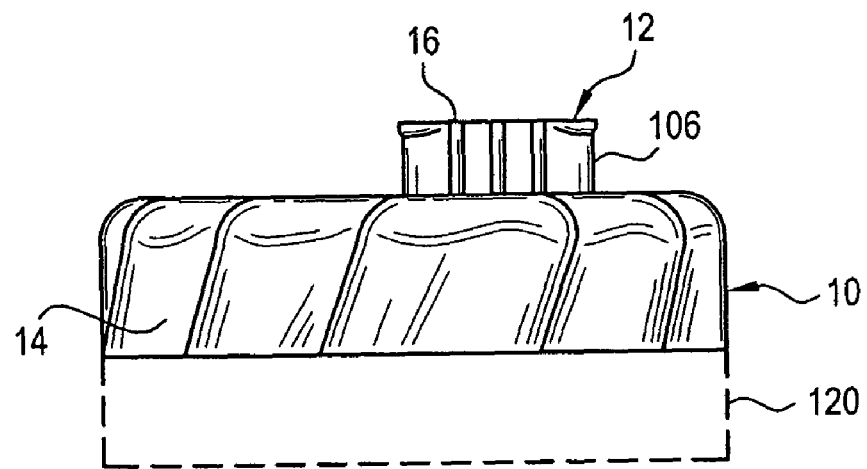
FIG. 2 is a side view of a body portion of the cap illustrated in FIGS. 1A through 1D, with a container to which the cap may be attached illustrated in dotted lines.
Figure 3:
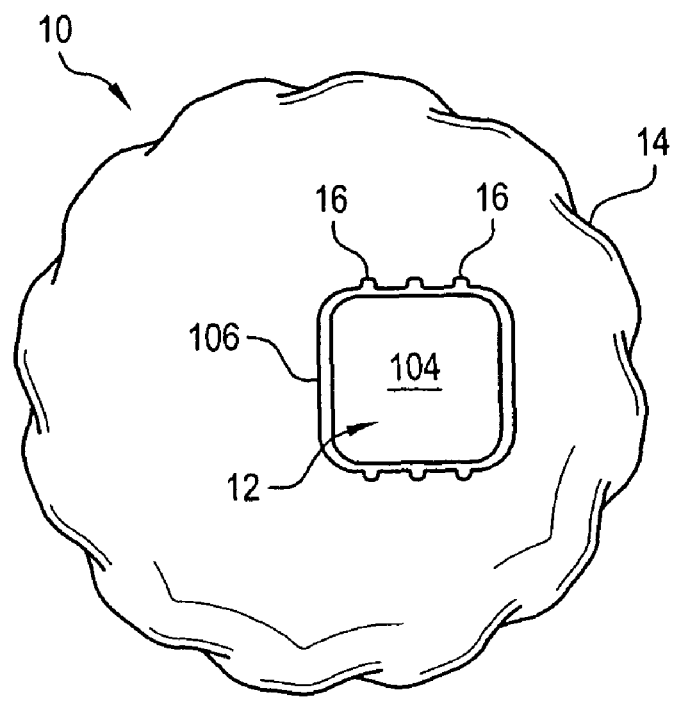
FIG. 3 is a top view of the body shown in FIG. 2.

Referring to FIGS. 1B and 2, cap 60 includes a body 10, a springing member 50 that extends between and is attached to respective ends of a loop portion 20, a valve 30 and a nozzle 40.

Body 10 can be fabricated of any moldable plastic suitable for making lightweight beverage containers. In a preferred embodiment, body 10 is molded high density polyethylene.

Referring to FIGS. 1A through 1D and FIG. 2, body 10 is preferably generally circular in shape. Preferably, body 10 defines the screw-on portion of cap 60 so that cap 60 may be attached to the mouth of a beverage container by mating internal threads 100, shown in FIGS. 1C and 1D, that are formed within body 10 of cap 60, with corresponding external threads on the beverage container. However, cap 60 and specifically body 10 may be attached to a beverage container by other methods and structures, or cap 60 and specifically body 10 may be molded permanently onto a beverage container to cover the mouth of the container.

Body 10 of cap 60 preferably also includes gripping indentations 14 formed around at least part, and preferably all, of the external periphery of body 10. Gripping indentations 14 are preferably formed as gentle curves in the exterior side wall 102 of body 10, as illustrated in FIG. 1A, to facilitate manual gripping of body 10 and cap 60. Indentations 14 provide a surface of exterior side wall 102 allowing one to manually grip, turn, and easily remove cap 60 from a container. Indentations 14 also facilitate simple manual grasping of a beverage container to which cap 60 is connected.

As shown in FIGS. 1A through 1D, 2 and 3, body 10 further includes a valve support 12 that preferably protrudes upwardly, out from body 10. The open interior of valve support 12 defines an interior aperture 104 in body 10. Aperture 104 in valve support 12 allows a beverage in a container 120 to flow through body 10 and hence through cap 60. Valve support 12 also preferably has a plurality of teeth 16 formed on the rectangularly annular exterior surface 106 of valve support 12 that serve to guide a loop portion 20 on to body 10 of cap 60 during assembly. FIG. 2 illustrates body 10 and the manner in which valve support 12 extends vertically therefrom.

FIGS. 4 through 7 illustrate loop portion 20 of cap 60. Loop 20 may be any preferably moldable thermoplastic that is suitable for making lightweight beverage containers. The material used for fabricating loop 20 must have some "memory" so that when deformed, loop 20 does not fracture but returns to its previous form and shape, when the deforming force or means is removed. Loop 20 may be a polyamide and most preferably is nylon.

Figure 4:
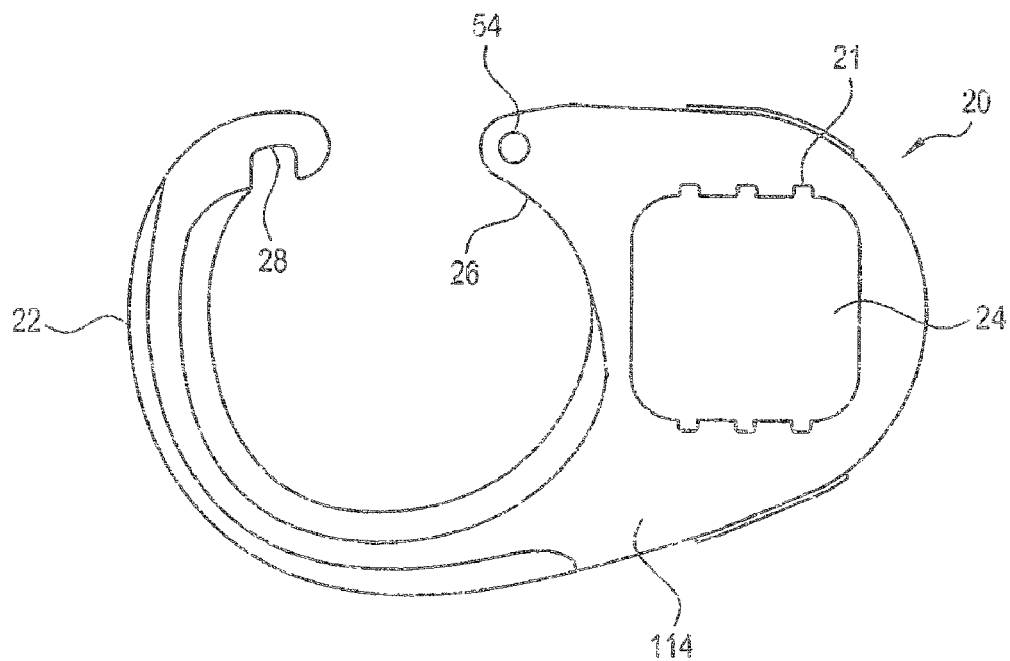
FIG. 4 is a bottom view of a loop portion of the cap illustrated in FIGS. 1A through 1D.

As shown in the bottom view of loop 20 in FIG. 4, loop 20 includes an arcuate member 22 having a first extremity portion 26 and a second extremity portion 28, which are spaced apart as shown in FIG. 4.

Figure 5:
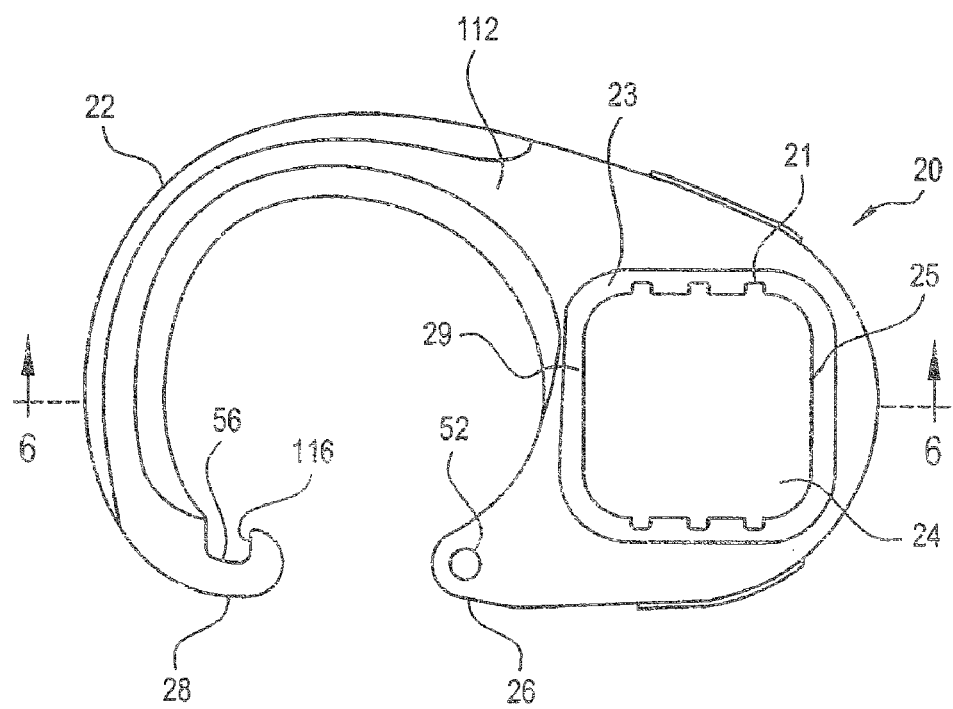
FIG. 5 is a top view of the loop illustrated in FIG. 4.
Figure 6:
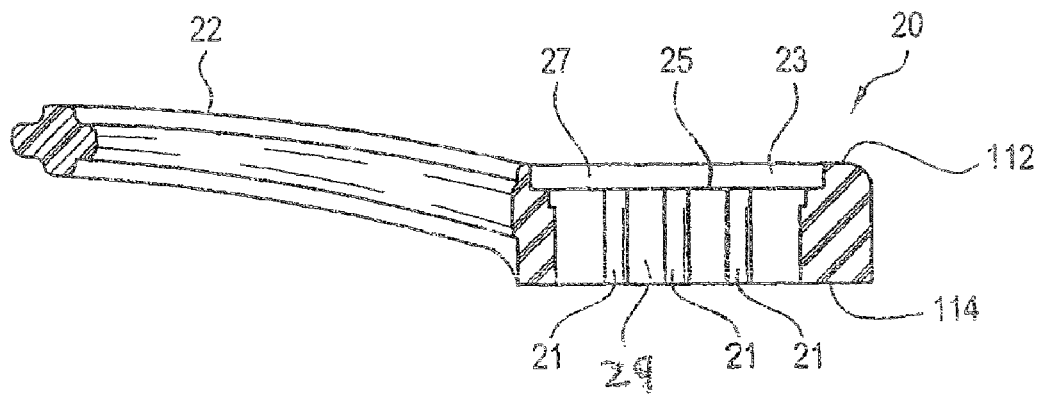
FIG. 6 is a sectional view of the loop taken along lines and arrows 6-6 in FIG. 5.
Figure 7:
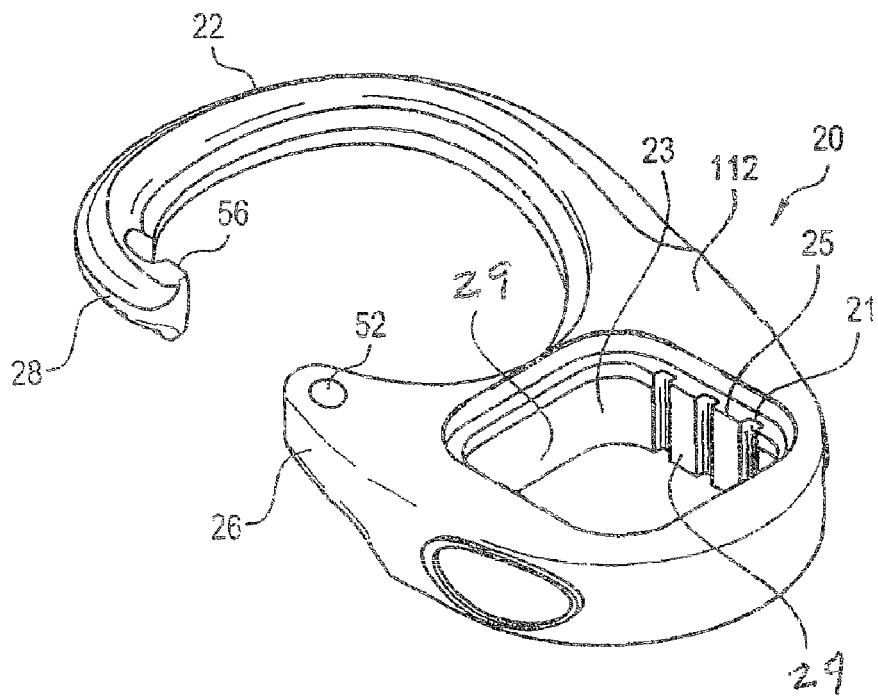
FIG. 7 is an isometric view of the loop illustrated in FIGS. 4 through 6.

Referring to loop 20 as shown in FIG. 5, a passageway 23 extends through loop 20. As shown in FIGS. 5, 6 and 7, a rectangular annular recess 27 is formed around the periphery of the opening to passageway 23 in upper exterior surface 112 of loop 20. The portion of the annular wall of passageway 23 that is inboard of annular recess 27 is designated 29 and has a plurality of vertically elongated grooves 21 formed therein. Grooves 21 run the vertical height of annular wall portion 29, as shown in FIGS. 6 and 7. A receiving edge 25 defines the bottom of recess 27 and is perpendicular to and borders annular wall portion 29 of passageway 23, as shown in FIGS. 5, 6 and 7.

Referring to FIGS. 4 through 7, an opening 24 to passageway 23 that is formed in lower exterior surface 114 of loop 20 is smaller than the opening to passageway 23 formed in upper surface 112. This is since there is no annular recess (such as recess 27) formed at opening 24 to passageway 23 in lower exterior surface 114 of loop 20, as is apparent from FIGS. 4 and 6.

Referring to FIG. 5, opening 24 and the plurality of grooves 21 in wall 110 of passageway 23 through loop 20 are formed of size and shape to facilitate mating with valve support 12 and the plurality of teeth 16 on valve support 12 respectively. The shape and size of the exterior periphery of valve support 12 substantially correspond to the shape and size of passageway 23 through loop 20. Once loop 20 is fitted on valve support 12, loop 20 is preferably sonically welded to body 10.

As shown in FIG. 5, first extremity portion 26 of loop 20 has a first bore 52 formed therein which does not extend through loop 20 but has a bottom and hence is "blind". As shown in FIG. 4, first extremity portion 26 also has a second bore 54 formed therein, which also does not extend through loop 20 but has a bottom and hence is also "blind". First bore 52 and second bore 54 are offset from one another as seen by comparing the location of bore 54 in FIG. 4 with the location of bore 52 in FIG. 5; that is bores 52 and 54 are not aligned, and are formed in oppositely facing upper and lower surfaces 112 and 114 of loop 20.

As shown in FIGS. 4 and 5, second extremity portion 28 of loop 20, removed from first extremity portion 26, includes an open notch 56 having a generally planar retaining edge 116 that extends in direction generally parallel to the axes of bores 52 and 54, such that a line drawn from the axis of bore 52 or 54 to edge 116 would be generally perpendicular to retaining edge 116.

Referring to FIGS. 1A and 1B, springing member 50 is attached to loop 20 of cap 60.

Figure 8:
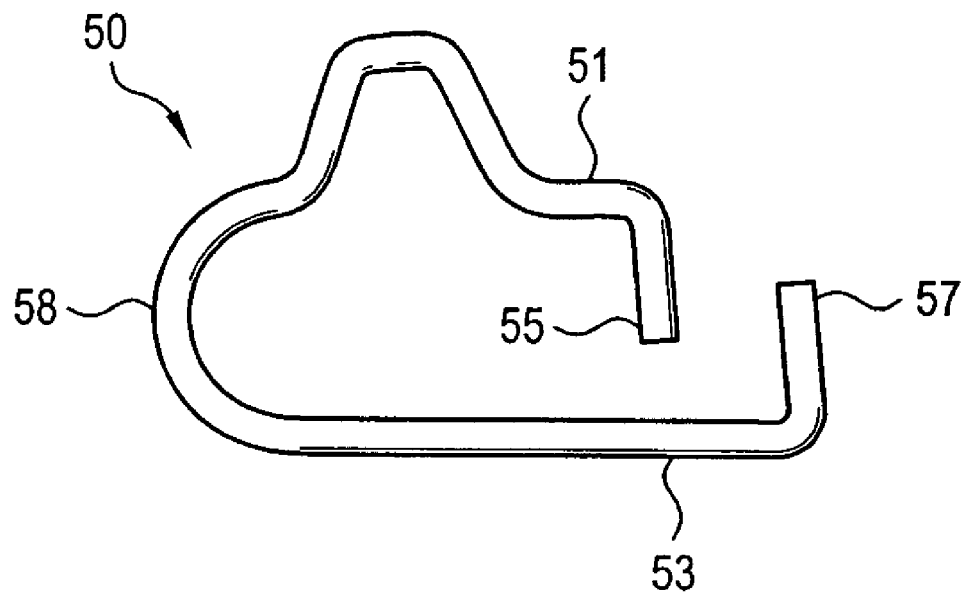
FIG. 8 is a side view of a snap ring portion of the cap illustrated in FIGS. 1A through 1D.
Figure 9:
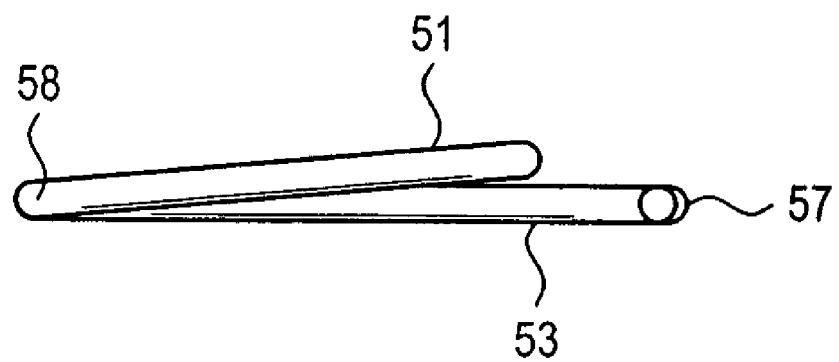
FIG. 9 is a top view of the snap ring illustrated in FIG. 8.

As shown in FIG. 8, springing member 50 includes a first leg 51 with a first foot portion 55, and a second leg 53 with a second foot portion 57. First leg 51 and second leg 53 of springing member 50 are of different lengths and, when in a relaxed unstressed condition, are at least slightly laterally offset one from another as shown in FIG. 9. Preferably, springing member 50 is a single continuous piece of wire. The wire may be any metal or plastic having an adequate spring and memory characteristic. Preferably spring member 50 is a nylon or polycarbonate wire.

Referring to FIGS. 4, 5 and 8, springing member 50 is attached to loop 20 with first foot portion 55 of first leg 51 residing in first bore 52 and second foot portion 57 of second leg 53 residing in second bore 54, both as formed in first extremity portion 26 of loop 20. When first foot portion 55 of first leg 51 and second foot portion 57 of second leg 53 are inserted into first aperture 52 and second aperture 54 respectively, the offset, non-alignment of the axes of first and second apertures 52, 54 results in the normally laterally offset first leg 51 and second leg 53, which are respectively substantially perpendicular to feet 55 and 57, being forcibly aligned such that both legs 51 and 53 lie in the same plane, which is a vertical plane when cap 60 is placed on a bottle 120 and the bottle is standing up, with the mouth of the bottle at the bottle upper extremity. The memory characteristic of springing member 50 with the forcibly aligned first leg 51 and second leg 53 causes these legs to want to return to their laterally offset, relaxed position, close to the position illustrated for springing member 50 in FIG. 1, thereby creating a spring force or action. Specifically, if springing member 50 is displaced from the position illustrated in FIG. 1A by a person moving springing member 50 with one's finger away from planar retaining edge 116, with spring member 50 moving via pivotal motion of foot portions 55, 57 resident within bores 52, 54, the memory characteristic of springing member 50 will cause springing member 50 to resist such motion and to attempt to return to the position shown in FIG. 1A.

Springing member 50 is angularly pivotally moveable in response to manually applied force. In the closed position illustrated in FIG. 1A, the curved portion 58 of springing member 50 rests in retaining notch 56 formed in second extremity portion 28 of loop 20 in arcuate member 22. Springing member 50 in the closed position, as shown in FIG. 1A, connects the spaced apart first and second extremity portions 26, 28 thus forming a closed continuous loop 20 of arcuate member 22. When adequate, preferably manual, force is applied to springing member 50 to move springing member 50 towards the center of loop 20, springing member 50 resists but is moved by such force and angularly pivots to an open position leaving a gap in what was the closed loop 20. When the preferably manually applied force is removed, the memory characteristic and resulting spring action causes springing member 50 to return to the closed position.

FIGS. 10 and 11 further illustrate valve 30, which can be any moldable plastic suitable for making lightweight beverage containers. Preferably valve 30 is high density polyethylene.

As shown in FIG. 10, valve 30 includes a rectangular base 32 extending completely around the outer periphery of valve 30 at approximately the vertical midpoint of valve 30, with an upper valve member 34 and a lower valve member 36 extending from opposite sides of base 32. A slightly tapered but generally cylindrical interior member 38 runs concentrically the entire length of the upper and lower valve members 34 and 36, and extends outwardly beyond the extremity of upper valve member 34. As shown in FIG. 11, interior cylindrical member 38 begins at a first end with a larger outer circumference within lower valve member 36 and ends at a second, upper end with a smaller outer circumference.

Valve body 30 attaches to body 10 of cap 60 by inserting lower valve member 36 into the opening of the perimeter formed by valve support 12. In addition, base 32 rests on receiving edge 25 of loop 20. The shape of the perimeter and the size of the opening in the center of the perimeter formed by valve support 12 are such that lower valve member 36 fits in the opening of the perimeter formed by valve support 12. The size and shape of passageway 23 and receiving edge 25 of loop 20 substantially correspond to the shape and size of base 32.

Nozzle 40, illustrated in FIGS. 12 and 13, can be any inorganic polymer; preferably nozzle 40 is silicone.

As shown in FIG. 12, nozzle 40 includes a first annular tubular section 42 and ridges 46 and, as shown in FIG. 13, further includes a second annular tubular section 44 of larger size than first annular tubular section 42. The inner diameter of first annular tubular section 42 is preferably substantially the same as the smallest outer circumference of interior cylindrical member 38. The inner diameter of second annular tubular section 44 is preferably substantially the same as the largest outer circumference of cylindrical member 38. Nozzle 40 preferably attaches to valve 30 by inserting interior cylindrical member 38 into the second annular tubular section 44. Ridges 46 of nozzle 40 preferably allow nozzle 40 to slide up and down cylindrical member 38 with a desired degree of resistance so that nozzle 40 stays in a desired position to allow a desired flow, or no flow, from the container; these ridges also help to prevent nozzle 40 from being completely removed by interfering with interior annular rings 200 located on the inner annular surface of valve 30. A pair of lugs 130 molded onto the lower exterior surface of nozzle 40 prevent nozzle 40 from being removed from valve 30 by interference with a large one 200 L of rings 200 located close to the bottom on the inner annular surface of valve 30. The relative position of nozzle 40 in valve 30 regulates the flow of a beverage out of cap 60.

Figure 1D:
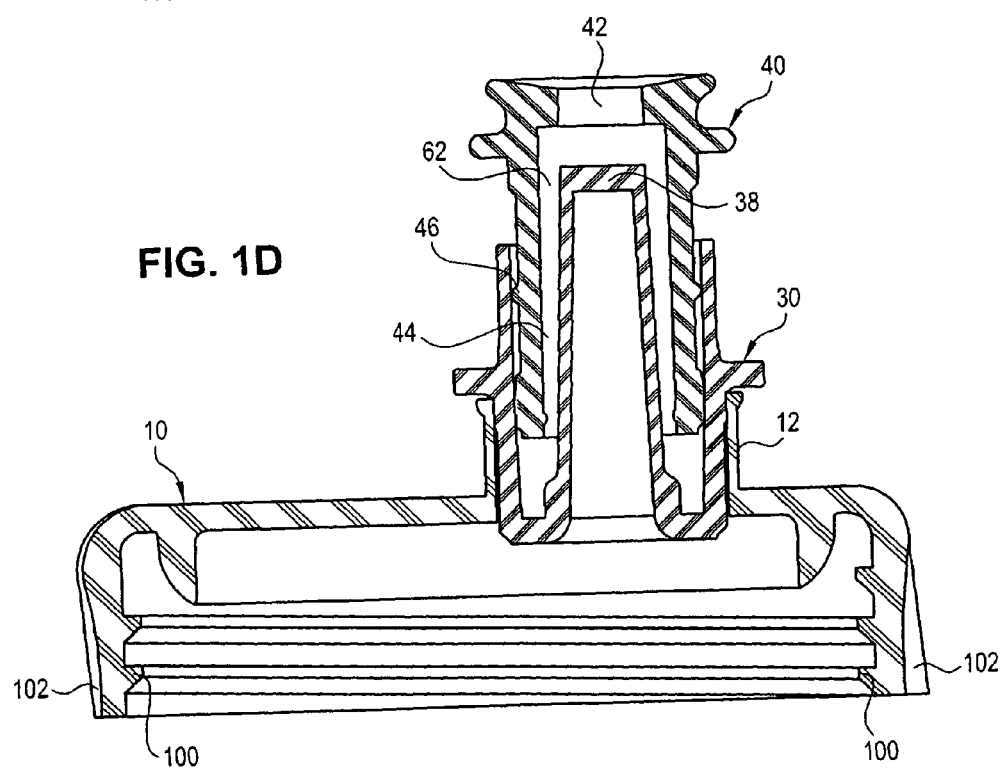
FIG. 1D is a vertical section of the cap illustrated in FIGS. 1A, 1B and 1C, taken at the same position as FIG. 1C, but with the nozzle in the open position.

Referring to FIGS. 1C and 1D, FIG. 1C shows the valve in the "closed" position. A seal is created by pressing nozzle 40 down on valve 30 until the largest circumference of interior cylindrical member 38 substantially mates with second annular tubular section 44 and smallest circumference of cylindrical member 38 substantially mates with the first annular tubular section 42.

FIG. 1D shows the "open" position. Nozzle 40 is pulled telescopically away from interior cylindrical member 38, thereby creating volume 62 in valve body 30. Beverage flows through member 12 and valve 30, thereby filling volume 62 until exiting through an opening of first annular tubular section 42 of nozzle 40.

What is claimed is:

1. A removable closure for a beverage container, comprising:
   a. a cap for covering a mouth of the container;
   b. an arcuate member, having a first extremity and a second extremity separated one from another, connection of which would close a periphery of the arcuate member;
   c. a passageway, having a rectangular annular recess formed around a periphery of the passageway, extending through the arcuate member and by which the arcuate member is connected to the cap;

d. a base of a valve, seated in the rectangular annular recess formed around the periphery of the passageway; and e. a springing member, being pivotally moveable between a first position at which the springing member closes and completes the periphery of the arcuate member and a second position at which the periphery of the arcuate member is open.

2. The closure of claim 1 wherein the springing member is connected to the second extremity portion of the arcuate member.

3. The closure of claim 1 wherein the springing member is biased towards the first position.

4. The closure of claim 3 wherein the bias of the springing member is caused by a spring action.

5. The closure of claim 1 where a manually applied force pivotally moves the springing member to the second position.

6. The closure of claim 1 wherein the springing member is pivotally moveable to the first position to close the periphery of the arcuate member in the course of relieving an internal stress, and to the second position to open the periphery of the arcuate member responsively to a manually applied force.

7. The closure of claim 1 wherein an open notch is proximate to an end of the first extremity of the arcuate member, where an end of the springing member is received in the first position.

8. A closure for a container, the closure comprising:
a. a cover for a mouth of the container;
b. an arcuate member, having a rectangular-shaped passageway extending through the arcuate member and by which the arcuate member is connected to the cover, and having an open periphery;
c. a base of a valve, seated in the rectangular-shaped passageway; and
d. a springing member connected to the arcuate member, being pivotally moveable between a first position at which the springing member closes the periphery of the arcuate member and a second position at which the periphery of the arcuate member is open.

9. An openable and closeable snap ring for attachment to a cap of a container, comprising:

a. an arcuate member, having a rectangular-shaped passageway which extends through the arcuate member and by which the arcuate member is attached to the cap, and having an extremity with an open periphery; and
b. a springing member, being pivotally moveable between a first position at which the springing member closes the periphery of the arcuate member and a second position at which the periphery of the arcuate member is open; and
c. a valve, seated in the rectangular-shaped passageway.

10. The snap ring of claim 9 wherein the springing member is connected to the arcuate member remote from the extremity of the arcuate member.

11. The snap ring of claim 9 wherein the springing member is biased towards the first position.

12. The snap ring of claim 11 wherein the bias of the springing member is caused by a spring action.

13. The snap ring of claim 9 wherein the springing member is pivotally moveable to the first position to close the periphery of the arcuate member in the course of relieving an internal stress, and to the second position to open the periphery of the arcuate member responsively to a manually applied force.

14. The snap ring of claim 9 wherein an open notch is proximate to an end of the extremity of the arcuate member, where an end of the springing member is received in the first position.

15. The snap ring of claim 9 wherein the springing member comprises two legs, each leg being connected to the snap ring, the two legs being connected to each other at respective leg extremities which are remote from positions of connection to the snap ring.

16. The snap ring of claim 15 wherein the two legs are connected to each other by an additional segment of wire forming the two legs and said wire is continuous.

17. The snap ring of claim 15 wherein:
a. the two legs each include foot portions at leg extremities which connect to the snap ring, the foot portions extending perpendicularly to remaining parts of the legs; and
b. the snap ring includes a pair of receptacles receiving respective foot portions of respective legs.

* * * * *